United States Patent
Shen et al.

(10) Patent No.: US 9,521,348 B2
(45) Date of Patent: Dec. 13, 2016

(54) READOUT CIRCUITRY FOR IMAGE SENSOR

(71) Applicant: OMNIVISION TECHNOLOGIES, INC., Santa Clara, CA (US)

(72) Inventors: Jie Shen, Fremont, CA (US); Min Qu, Mountain View, CA (US); Hyunseok Lee, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/696,120

(22) Filed: Apr. 24, 2015

(65) Prior Publication Data

US 2016/0316164 A1 Oct. 27, 2016

(51) Int. Cl.
*H04N 5/3745* (2011.01)
*H04N 5/378* (2011.01)
*H04N 5/374* (2011.01)

(52) U.S. Cl.
CPC .............. *H04N 5/378* (2013.01); *H04N 5/374* (2013.01)

(58) Field of Classification Search
CPC ....... H04N 5/378; H04N 5/374; H04N 5/3745
See application file for complete search history.

(56) References Cited

U.S. PATENT DOCUMENTS

| | | | | |
|---|---|---|---|---|
| 2001/0040631 A1* | 11/2001 | Ewedemi | ........... | H04N 1/00307 348/294 |
| 2005/0078205 A1* | 4/2005 | Hynecek | .............. | H04N 5/3355 348/294 |
| 2007/0019085 A1* | 1/2007 | Suzuki | ................... | H04N 5/361 348/241 |
| 2007/0076109 A1* | 4/2007 | Krymski | .................. | H04N 5/32 348/300 |
| 2008/0258042 A1* | 10/2008 | Krymski | ................ | H04N 3/155 250/208.1 |

* cited by examiner

*Primary Examiner* — Tua Ho
(74) *Attorney, Agent, or Firm* — Blakely Sokoloff Taylor & Zafman LLP

(57) ABSTRACT

Readout circuitry to readout an array of image sensor pixels includes readout units that include a plurality of analog-to-digital converters ("ADCs"), a plurality of blocks of Static Random-Access Memory ("SRAM"), and a plurality of blocks of Dynamic Random-Access Memory ("DRAM"). The plurality ADCs is coupled to readout analog image signals two-dimensional blocks of the array of image sensor pixels. The plurality of blocks of SRAM is coupled to receive digital image signals from the ADCs. The digital image signals are representative of the analog image signal readout from the two-dimensional block of pixels. The plurality of blocks of DRAM is coupled to the blocks of SRAM. Each block of SRAM is coupled to sequentially output the digital image signals to each of the blocks of DRAM. Each of the readout units are coupled to output the digital image signals as a plurality of Input/Output ("IO") signals.

19 Claims, 4 Drawing Sheets

READOUT CIRCUITRY FOR IMAGE SENSOR

TECHNICAL FIELD

This disclosure relates generally to image sensors, and in particular to readout circuitry for image sensors.

BACKGROUND INFORMATION

An image sensor is an electronic device that converts light (in the form of an optical image) into electronic signals. Modern image sensors are generally semiconductor charge-coupled devices ("CCD") or active pixel sensors fabricated using complementary metal-oxide-semiconductor ("CMOS") technologies.

CMOS image sensors have become ubiquitous in many modern electronic devices. Cell phones, laptops, and cameras can all utilize CMOS image sensors as a primary method of image/light detection. Device manufacturers are striving to increase performance of image sensors to meet retail and commercial demand while also driving down costs.

One desired feature of image sensors is to have a high-frame rate for capturing slow-motion video and bursts of images, among other use cases. Buyers of image sensors also prefer these high-frame rate images be captured using a high resolution image sensor. However, capturing high-resolution, high-frame rate images creates bottleneck challenges between capturing the images with the image sensor pixels of the pixel array and storing the digital images to memory. Hence, improving the flow and speed of capturing images and storing them to memory while keeping both the size and cost of the image sensor at reasonable levels is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of readout circuitry and imaging systems incorporating the readout circuitry are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
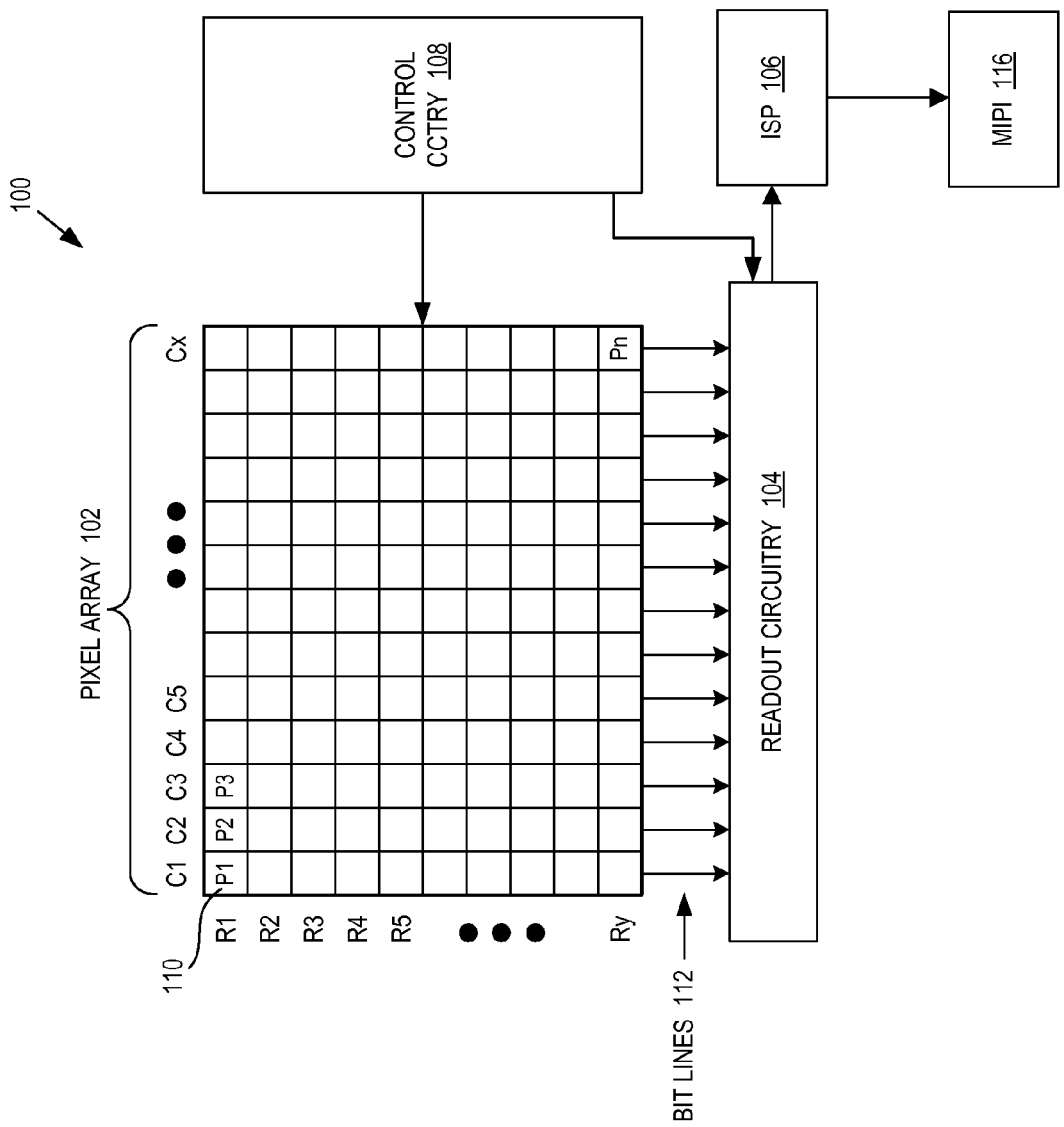
FIG. 1 illustrates a block diagram schematic of an example imaging system including readout circuitry, in accordance with an embodiment of the disclosure.

FIG. 1 illustrates a block diagram schematic of an example imaging system 100 that includes a pixel array 102, readout circuitry 104, control circuitry 108, Image Signal Processor ("ISP") 106, and Mobile Industry Processor Interface ("MIPI") 116, in accordance with an embodiment of the disclosure. Pixel array 102 is an array of image sensor pixels 110 that may be a Complimentary Metal-Oxide-Semiconductor ("CMOS") pixel array. As shown in the depicted example, pixel array 102 is coupled to control circuitry 108 and readout circuitry 104. Control circuitry 108 is coupled to pixel array 102 to control operational characteristics of pixel array 102 in order to capture digital images generated by image light received by pixel array 102. For example, control circuitry 108 may generate a shutter signal or a plurality of shutter signals for controlling image acquisition. Control circuitry 108 is also coupled to readout circuitry 104 so that control circuitry 108 can coordinate image acquisitions of pixel array 102 with reading out pixel array 102.

In one example, pixel array 102 is a two-dimensional array of pixels 110 (e.g., pixels P1, P2 . . . , Pn). As illustrated, each pixel 110 is arranged into a row (e.g., rows R1 to Ry) and a column (e.g., column C1 to Cx) to acquire image data of a person, place, object, etc., which can then be used to render an image of the person, place, object, etc. Each pixel 110 may utilize 3-transistor ("3T") or 4-transistor ("4T") configurations, as is known in the art. In one example, after each pixel 110 has acquired its image data or image charge, the image data is read out by readout circuitry 104 as analog image signal through bit lines 112 (which may be column lines).

Readout circuitry 104 is coupled to receive the analog image signals from pixel array 102 and output digital image signals to ISP 106 for further image processing. Imaging system 100 optionally includes MIPI 116 when imaging system 100 is to be included in a mobile device.

Figure 2:
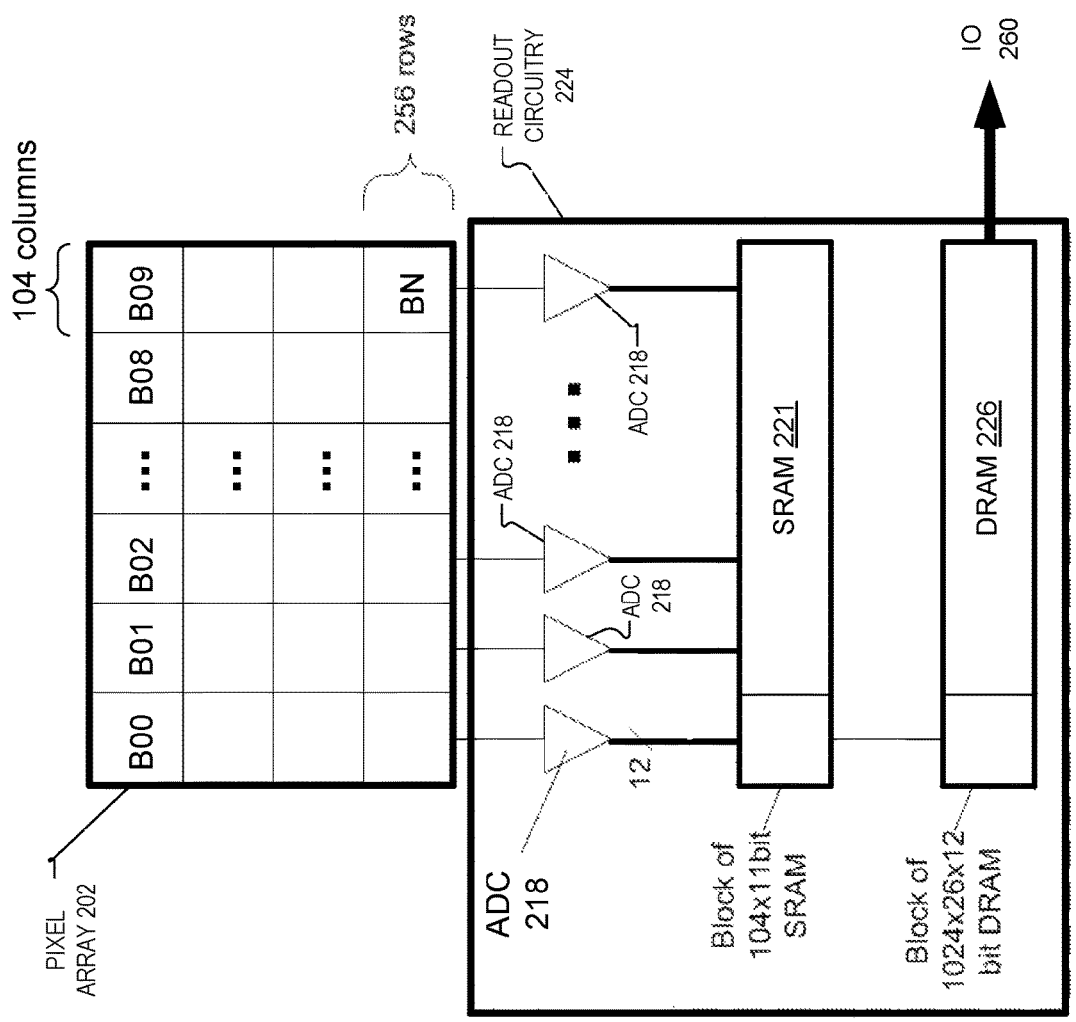
FIG. 2 illustrates a block diagram schematic including a pixel array and readout circuitry for reading out the pixel array, in accordance with an embodiment of the disclosure.

FIG. 2 illustrates a block diagram schematic including a pixel array 202 and readout circuitry 224 for reading out pixel array 202, in accordance with an embodiment of the disclosure. Readout circuitry 224 is an example of a portion of readout circuitry for including in readout circuitry 104 and pixel array 202 is one example of pixel array 102. Pixel array 202 includes a plurality of two-dimensional blocks of pixels B00-BN. In the illustrated embodiment, each two-dimensional block of pixels includes 104 columns and 256 rows and pixel array 202 is ten blocks wide and 4 blocks high giving pixel array 202 1040 columns and 1024 rows. In other embodiments, each two-dimensional block of pixels includes c columns and r rows where c and r are integers. Readout circuitry 224 includes a plurality of analog-to-digital converters ("ADCs") 218 that are coupled to readout the analog image signals from the two-dimensional blocks of pixels and convert the analog image signals to digital image signals that are representative of the analog image signals. It is understood that one or more ADC 218 may be used to read out each two-dimensional block of pixels. In other embodiments, a plurality of ADCs 218 is coupled to read out analog image signals from m different two-dimensional blocks of pixels (e.g. B00-BN). In one embodiment, m is an integer greater than zero. In yet other embodiments, each ADC 218 as illustrated in FIG. 2 may represent a plurality of integer c analog-to-digital converter circuits (one for each column in a pixel block). One or more two-dimensional blocks of pixels B00-BN may share ADC 218. Furthermore, readout circuitry 224 may include unillustrated amplification circuitry and/or selection circuitry, as needed. In FIG. 2, ADCs 218 convert the analog image signals into 12-bit pixel values.

After conversion by the ADCs, a digital pixel value for each image pixel in the two-dimensional block of pixels is stored into Static Random-Access Memory ("SRAM"). In particular, the digital pixel values for each row of the two-dimensional block of pixels are stored in a one-dimensional block of SRAM 221. In FIG. 2, a row of the two-dimensional block of pixels includes 104 pixels corresponding to the 104 columns of each block of pixels. In the illustrated embodiment, one block of SRAM includes 104 elements of 11-bit values to correspond with the number of columns in the two-dimensional blocks of image sensor pixels. In other embodiments each block of SRAM 221 includes c elements to store c digital image signals from the ADC. Readout circuitry 224 also includes a two-dimensional array of Dynamic Random-Access Memory ("DRAM") 226 having a first dimension and a second dimension. In the illustrated embodiment, one block of DRAM has a first dimension of 1024 and a second dimension of 26 for storing 26,624 12-bit pixel values. Correspondingly, the product of 104 columns and 256 rows of the example two-dimensional blocks of image sensor pixels is also 26,624 and the second dimension of the two-dimensional array of DRAM (26) is the quotient of the elements in the SRAM block (104) divided by the number of DRAM blocks (4) in readout unit 300. Each block of DRAM stores x digital image signals, where x is an integer and is a product of c and r, in some embodiments.

FIG. 2 shows one block of SRAM 221 and one block of DRAM 226 because there is one block of SRAM 221 and one block of DRAM 226 for each two-dimensional block of image sensor pixels in pixel array 202. However, each block of DRAM 226 receives digital pixel values from more than one block of SRAM 221. Each SRAM block may be coupled to sequentially output the digital image signals to m blocks of DRAM (where m is an integer), in some embodiments.

Figure 3:
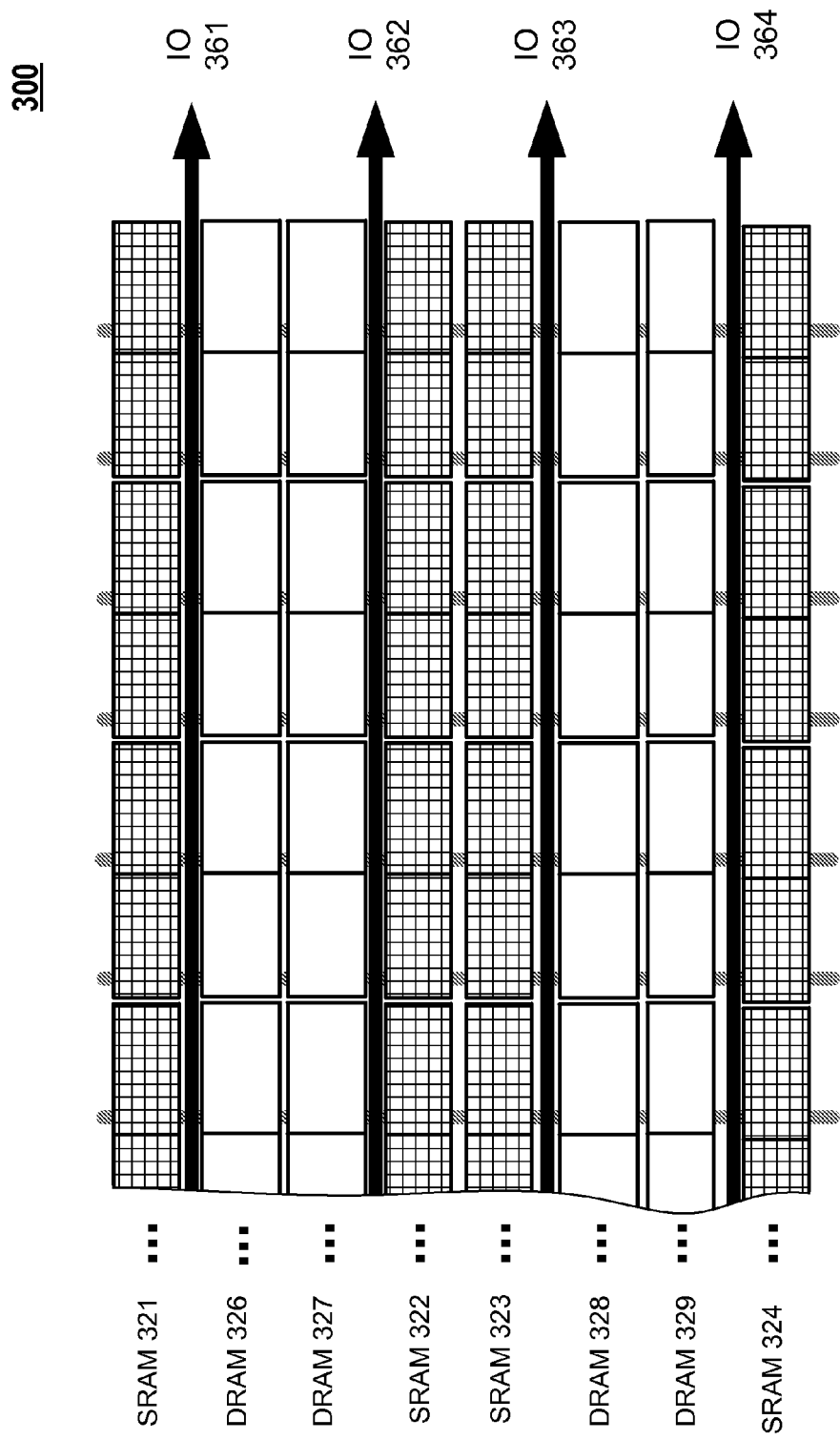
FIG. 3 illustrates a portion of an example readout unit in readout circuitry, in accordance with an embodiment of the disclosure.

FIG. 3 illustrates a portion of an example readout unit 300 in example readout circuitry, in accordance with an embodiment of the disclosure. In FIG. 3, SRAM block 321 receives the digital image signals (pixel values) from a specific two-dimensional block of pixels (e.g. B00). SRAM block 321 has an exclusive relationship with its block of pixels in that all the pixel values stored in SRAM block 321 come from a single block of pixels (e.g. B00) via ADC(s) 218. Similarly, SRAM block 322 also has an exclusive relationship with another block of pixels (e.g. B01) in that all the pixel values from the block of pixels (e.g. B01) are stored in SRAM 322. SRAM block 323 and SRAM block 324 also have exclusive relationships with different blocks of image sensor pixels (e.g. B02 or B03).

After a given SRAM block stores its pixel values, it then outputs those pixel values to more than one DRAM blocks. In the illustrated embodiment, each SRAM block sequentially outputs its stored pixel values to four different DRAM blocks, which are DRAM blocks 326, 327, 328, and 329. In other words, each DRAM block in readout unit 300 is coupled to receive digital image signals (pixel values) from more than one SRAM block; each SRAM block is coupled to send a given DRAM block in readout unit 300 a portion of their digital image signals while sending the remaining digital image signals to the remaining DRAM blocks in readout unit 300. Therefore, each DRAM block is coupled to receive a portion of its digital image signals from a single SRAM block and coupled to receiving additional digital image signals from the other SRAM blocks in readout unit 300. In readout unit 300, there are an equal number of SRAM blocks and DRAM blocks. Each DRAM block is then coupled to output its digital pixel values received from the SRAM blocks as an Input/Output ("IO"). DRAM block 326 outputs IO 361, DRAM block 327 outputs IO 362, DRAM block 328 outputs IO 363, and DRAM block 329 outputs IO 364.

Figure 4:
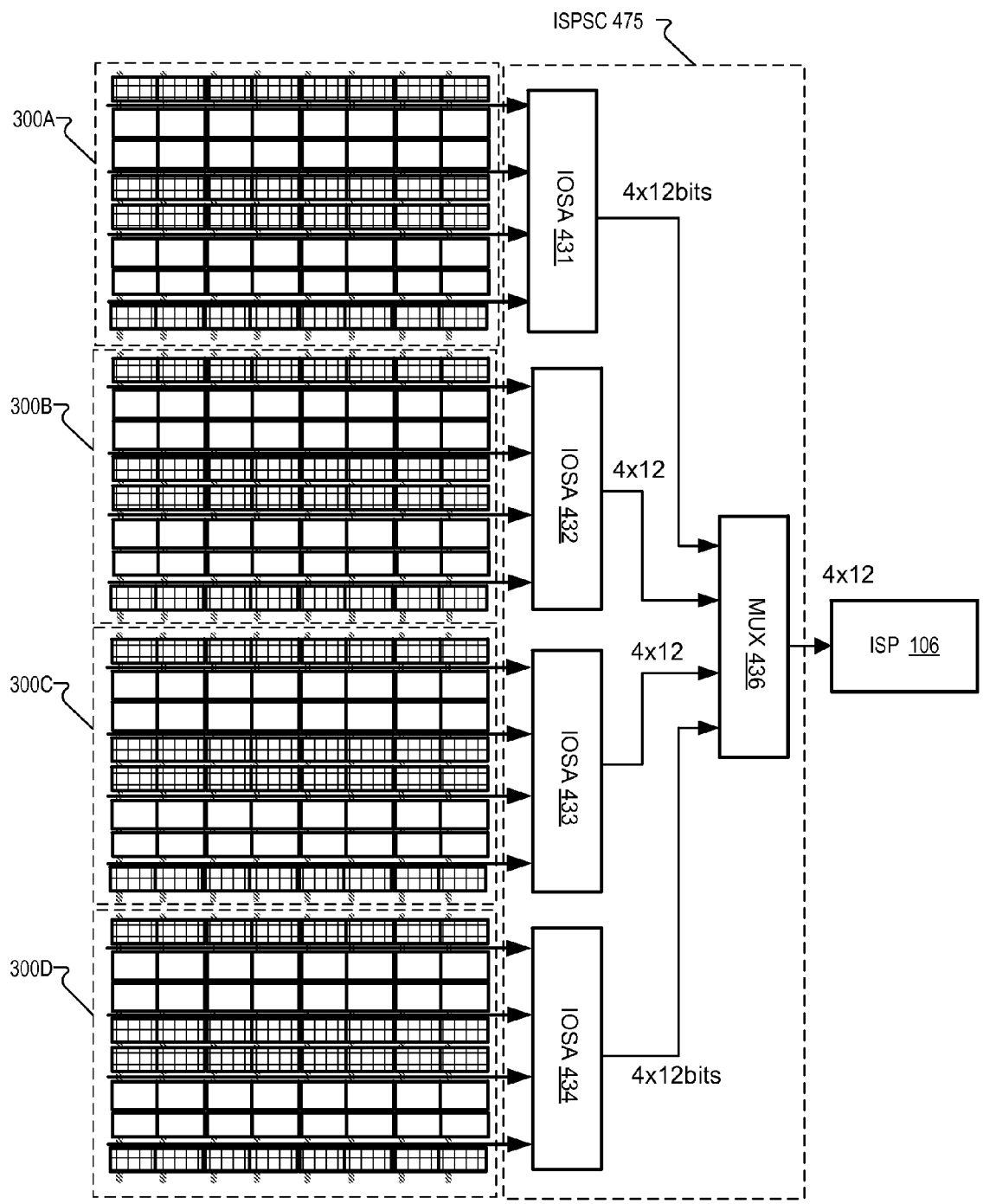
FIG. 4 illustrates a plurality of readout units and Image Signal Processing Selection Circuitry, in accordance with an embodiment of the disclosure.

FIG. 4 illustrates a plurality of readout units 300A-D and Image Signal Processing Selection Circuitry ("ISPSC") 475, in accordance with an embodiment of the disclosure. ISPSC 475 is coupled to receive the IO signals outputted by each readout unit 300A-D. In FIG. 4, ISPSC 475 receives sixteen IO signals. ISPSC 475 is configured to multiplex the received IO signals for output to ISP 106 such that ISP 106 receives the digital image signals line-by-line.

In the illustrated embodiment, ISPSC 475 includes Input Output Sense Amplifiers ("IOSAs") 431-434. IOSAs are input/output peripherals for DRAM. Each IOSA receives all the IO signals from a given readout unit, in FIG. 4. For example, IOSA 431 receives all the IO signals from readout unit 300A and IOSA 432 receives all the IO signals from readout unit 300B. Multiplexor ("MUX") 436 receives the outputs from each of the IOSAs 431-434 and multiplexes the outputs to feed the digital image signals to ISP 106 so that ISP 106 receives the digital image signals line-by-line. In the illustrated embodiment, ISP 106 receives four 12-bit pixel values at a time.

The disclosed embodiments have the potential advantage of outputting a higher frame-rate than conventional readout circuitry that uses two blocks of SRAM per pixel block. In the disclosed embodiments, four pixel values can be provided to ISP 106 at the same time at a clock frequency of 100 MHz, which allows for an effective readout frequency of 400 MHz. By using DRAM instead of SRAM as the second memory block allows the IO signals to be outputted in parallel rather than being outputted sequentially via a multiplexor. This reduces the bottleneck effect seen in conventional readout circuitry for image sensors.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging system comprising:
   an array of image sensor pixels; and
   readout circuitry including:
   an analog-to-digital converter ("ADC") coupled to readout analog image signals from a two-dimensional block of pixels in the array of image sensor pixels;
   a block of Static Random-Access Memory ("SRAM") coupled to receive digital image signals from the ADC, wherein the digital image signals are representative of the analog image signal readout from the two-dimensional block of pixels; and
   a block of Dynamic Random-Access Memory ("DRAM") coupled to the block of SRAM to receive a portion of the digital image signals, wherein the block of DRAM is also coupled to receive additional digital image signals from additional blocks of SRAM, and wherein the block of SRAM is coupled to sequentially output a remaining portion of the digital image signals to additional DRAM blocks.

2. The imaging system of claim 1 further comprising:
   Image Signal Processing Selection Circuitry ("ISPSC") coupled to receive the portion of the digital image signals and the remaining portion of the digital image signals from the block of DRAM as Input/Output ("IO") signals, wherein the ISPSC is coupled to multiplex the IO signals for output to an Image Signal Processor ("ISP").

3. The imaging system of claim 2, wherein the ISPSC is also coupled to receive the additional digital image signals as additional IO signals from the additional DRAM blocks.

4. The imaging system of claim 2 further comprising:
   the ISP to process the IO signals into a digital image.

5. The imaging system of claim 4 further comprising:
   a Mobile Industry Processor Interface ("MIPI") coupled to receive the digital image from the ISP.

6. The imaging system of claim 1, wherein the two-dimensional block of pixels is integer number c columns by integer number r rows, and wherein the block of SRAM is coupled to store integer number c digital image signals from the ADC.

7. The imaging system of claim 6, wherein the block of DRAM stores integer number x of digital image signals, wherein integer number x is a product of the integer number c and the integer number r.

8. An image sensor comprising:
   an array of image sensor pixels; and
   readout circuitry having an array of readout units, wherein each readout unit includes:
   a plurality of analog-to-digital converters ("ADCs") coupled to readout analog image signals from integer number m of two-dimensional blocks of pixels in the array of image sensor pixels;
   a plurality of blocks of Static Random-Access Memory ("SRAM") coupled to receive digital image signals from the ADCs, wherein the digital image signals are representative of the analog image signals readout from the two-dimensional block of pixels, and wherein a quantity of the plurality of blocks of SRAM also numbering the integer number m; and
   a plurality of blocks of Dynamic Random-Access Memory ("DRAM") coupled to the blocks of SRAM, the plurality of blocks of DRAM also numbering the integer number m, each block of SRAM coupled to sequentially output the digital image signals to each of the blocks of DRAM, wherein each of the readout units are coupled to output the digital image signals as a plurality of Input/Output ("IO") signals, a quantity of the IO signals also numbering the integer number m.

9. The image sensor of claim 8 further comprising:
   Image Signal Processing Selection Circuitry ("ISPSC") coupled to receive the plurality of IO signals from the array of readout units, wherein the ISPSC is configured to multiplex the plurality of IO signals for output to an Image Signal Processor ("ISP") such that the ISP receives the digital image signals from the blocks of DRAM line-by-line.

10. The image sensor of claim 9, wherein the ISPSC includes Input Output Sense Amplifiers ("IOSAs") coupled to receive the integer number m quantity of IO signals from each readout unit.

11. The image sensor of claim 10, wherein the ISPSC includes a multiplexor coupled to the IOSAs, the multiplexor selecting whether to feed the integer number m quantity of IO signals to the ISP.

12. The image sensor of claim 8, wherein each block of SRAM is a one-dimensional array having a first number of elements that is the same as a number of columns c in the two-dimensional block of pixels, and wherein each block of DRAM is a two-dimensional array being a first dimension by a second dimension, wherein the first dimension is second number that is the same as a number of rows in the array of image sensor pixels and the second dimension is a third number that is a quotient of the first number divided by the integer number m.

13. The image sensor of claim 8, wherein the two-dimensional block of pixels is integer number c columns by integer number r rows, and wherein each of the blocks of SRAM is coupled to store the integer number c quantity of the digital image signals from the ADCs.

14. The image sensor of claim 13, wherein each of the blocks of DRAM stores integer number x of the digital image signals outputted by the plurality of SRAM blocks, wherein the integer number x is a product of the integer number c and the integer number r.

15. The image sensor of claim 14, wherein the image sensor is a Complimentary Metal-Oxide-Semiconductor ("CMOS") image sensor.

16. Readout circuitry to readout an array of image sensor pixels, the readout circuitry comprising:
    readout units, wherein each readout unit includes:
    a plurality of analog-to-digital converters ("ADCs") coupled to readout analog image signals from integer number m of two-dimensional blocks of the array of image sensor pixels;

a plurality of blocks of Static Random-Access Memory ("SRAM") coupled to receive digital image signals from the ADCs, wherein the digital image signals are representative of the analog image signal readout from the two-dimensional block of pixels, and wherein a quantity of the plurality of blocks of SRAM also numbering the integer number m; and a plurality of blocks of Dynamic Random-Access Memory ("DRAM") coupled to the blocks of SRAM, the plurality of blocks of DRAM also numbering the integer number m, each block of SRAM coupled to sequentially output the digital image signals to each of the blocks of DRAM, wherein each of the readout units are coupled to output the digital image signals as a plurality of Input/Output ("IO") signals, a quantity of the IO signals also numbering the integer number m.

17. The readout circuitry of claim 16 further comprising:
Image Signal Processing Selection Circuitry ("ISPSC") coupled to receive the plurality of IO signals from the array of readout units, wherein the ISPSC is configured to multiplex the plurality of IO signals for output to an Image Signal Processor ("ISP") such that the ISP receives the digital image signals from the blocks of DRAM line-by-line.

18. The readout circuitry of claim 17, wherein the ISPSC includes Input Output Sense Amplifiers ("IOSAs") coupled to receive the integer number m quantity of IO signals from each readout unit.

19. The readout circuitry of claim 18, wherein the ISPSC includes a multiplexor coupled to the IOSAs, the multiplexor selecting between the integer number m quantity of IO signals to feed to the ISP.

* * * * *